(12) United States Patent
Kifuku

(10) Patent No.: US 6,876,910 B2
(45) Date of Patent: Apr. 5, 2005

(54) ELECTRIC POWER STEERING SYSTEM

(75) Inventor: Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 35 days.

(21) Appl. No.: 09/286,418

(22) Filed: Apr. 6, 1999

(65) Prior Publication Data

US 2002/0026267 A1 Feb. 28, 2002

(30) Foreign Application Priority Data

Sep. 30, 1998 (JP) .......................................... 10-278181

(51) Int. Cl.$^7$ .......................... A01B 69/00; B62D 11/00; B62D 5/04
(52) U.S. Cl. ............................ 701/41; 701/42; 180/443; 180/446
(58) Field of Search ............................. 701/41, 42, 43; 180/443, 446, 412, 413, 414, 415, 416

(56) References Cited

U.S. PATENT DOCUMENTS

| | | | | |
|---|---|---|---|---|
| 3,870,103 A | * | 3/1975 | Abel | 173/100 |
| 4,391,340 A | * | 7/1983 | DeLorean | 180/79 |
| 4,527,653 A | * | 7/1985 | Agarwal et al. | 180/79.1 |
| 4,629,952 A | * | 12/1986 | Shimizu | 318/432 |
| 4,681,181 A | * | 7/1987 | Shimizu | 180/79.1 |
| 4,688,655 A | * | 8/1987 | Shimizu | 180/79.1 |
| 4,761,595 A | * | 8/1988 | Goor | 318/568 |
| 4,771,843 A | * | 9/1988 | Shimizu | 180/79.1 |
| 4,771,845 A | * | 9/1988 | Shimizu | 180/79.1 |
| 4,784,002 A | * | 11/1988 | Io | 324/207.13 |
| 4,881,414 A | * | 11/1989 | Setaka et al. | 324/207.18 |
| 5,467,279 A | * | 11/1995 | Wada et al. | 701/42 |
| 5,482,129 A | * | 1/1996 | Shimizu | 180/79.1 |
| 5,631,833 A | * | 5/1997 | Wada et al. | 701/42 |
| 5,740,040 A | | 4/1998 | Kifuku et al. | 701/41 |
| 5,992,557 A | * | 11/1999 | Nakamura et al. | 180/446 |
| 6,102,151 A | * | 8/2000 | Shimizu et al. | 180/446 |
| 6,262,547 B1 | * | 7/2001 | Kifuku et al. | 318/432 |

FOREIGN PATENT DOCUMENTS

| | | |
|---|---|---|
| DE | 197 42 370 A1 | 4/1998 |
| JP | 3-42235 | 6/1991 |
| JP | 4-72749 | 11/1992 |
| JP | 04-356274 | 12/1992 |
| JP | 8-175404 | 7/1996 |
| JP | 08-175404 | 7/1996 |

* cited by examiner

Primary Examiner—Thomas G. Black
Assistant Examiner—Brian J Broadhead
(74) Attorney, Agent, or Firm—Sughrue Mion, PLLC

(57) ABSTRACT

To improve a steering feeling, an estimated value of static friction of a steering system is obtained by static friction computing means and a static friction compensation current is computed based on this estimated value of static friction by static friction compensation current computing means to compensate for the static friction of the steering system.

19 Claims, 13 Drawing Sheets

ELECTRIC POWER STEERING SYSTEM

BACKGROUND OF THE INVENTION

1. Field of the Invention

The present invention relates to an electric power steering system for assisting steering force with a motor.

2. Description of the Prior Art

A conventional electric power steering system determines steering assist force based on a steering torque applied to a steering shaft connected to a steering wheel and a car speed and controls the output torque of a motor connected to a steering system based on this steering assist force to assist the steering force of the steering system. To improve a steering feeling, the output torque of the motor is corrected based on the angular velocity or angular acceleration of the motor, the time differential value of steering torque or the like.

FIG. 13 is a diagram showing the constitution of software used for the steering control of a conventional electric power steering system disclosed by Japanese Laid-open Patent Application No. 8-175404, for example. In FIG. 13, reference numeral 1 denotes a motor, connected to a steering system through a speed reducer, for generating steering assist force, 2 motor angular velocity computing means for computing the back electromotive force of the motor from a motor detection current. Im and a motor application voltage Vm to obtain an estimated value of rotation angular velocity (to be referred to as "motor angular velocity" hereinafter) ωm of the motor 1 and outputting the value as a motor angular velocity estimated value ω, and 3 motor angular acceleration computing means for computing a motor angular acceleration by differentiating the above motor angular velocity estimated value ω and outputting the value as a motor angular acceleration estimated value (dω/dt). Reference numeral 4 represents coulomb friction compensation current computing means for computing a coulomb friction compensation current Ic for compensating for the coulomb friction of the steering system based on the above motor angular velocity estimated value ω, 5 viscous friction compensation current computing means for computing a viscous friction compensation current Id for compensating for the viscous friction of the steering system based on the above motor angular velocity estimated value ω, 6 inertia compensation current computing means for computing an inertia compensation current Ij for compensating for the inertia moment of the steering system based on the motor angular acceleration estimated value (dω/dt), 7 steering force assist current computing means for computing a steering force assist current Is for assisting the steering force of a driver based on the steering torque Vt of the driver, and 8 current control means for feedback controlling the drive current of the motor 1 so that the above motor detection current Im and a motor target current Isum obtained by adding together the above coulomb friction compensation current Ic, the viscous friction compensation current Id, the inertia compensation current Ij and the steering force assist current Is become equal to each other.

A description is subsequently given of the operation of the electric power steering system. The motor angular velocity computing means 2 computes an estimated value ω of motor angular velocity ωm from a motor detection current Im and a motor application voltage Vm. The motor 1 is a separately excited DC motor. When the motor 1 turns to assist the steering force of a driver by his operation of the steering wheel, a back electromotive force Ve proportional to the motor angular velocity ωm is generated in the motor 1. The relationship between the motor angular velocity ωm and the back electromotive force Ve of the motor can be expressed by the following expression (1):

$$Ve = Ke \cdot \omega m \quad (1)$$

wherein Ve is a back electromotive force of the motor (V), Ke is a constant of the back electromotive force of the motor (V·s/rad) and ωm is a motor angular velocity (rad/s).

The motor angular velocity computing means 2 computes a motor back electromotive force Ve based on the following expression (2) from a motor detection current Im and a motor application voltage Vm:

$$Ve = Vm - Im \cdot Ra \quad (2)$$

wherein Ra is a resistance of a motor armature.

The estimated value ω of motor angular velocity ωm is computed from the expression ω=(Vm−ImRa)/Ke using the value of motor back electromotive force Ve obtained from the above expression (2) and the above expression (1). This motor angular velocity estimated value ω is output to the motor angular acceleration computing means 3, the coulomb friction compensation current computing means 4 and the viscous friction compensation current computing means 5.

The motor angular acceleration computing means 3 obtains a motor angular acceleration estimated value (dω/dt) by carrying out differential operation on the above motor angular velocity estimated value ω from the motor angular velocity computing means 2 and outputs it to the inertia compensation current computing means 6.

In the electric power steering system, since the friction of the motor 1 is transmitted to the steering system, the friction of the steering system increases, whereby the returnability of the steering wheel at a low speed may deteriorate.

The coulomb friction compensation current computing means 4 computes a coulomb friction compensation current Ic for compensating for an increase in the friction of the steering system. As shown in FIG. 14, this coulomb friction compensation current Ic is a current having a fixed value which is given when the motor angular velocity estimated value ω exceeds a predetermined value ω0 so that steering assist force is applied in the same direction as the rotation direction of the motor 1.

Since the motor 1 is connected in the electric power steering system, the inertia moment of the steering system increases. This leads to an increase in steering force when the steering wheel is turned quickly or the poor maneuverability of the steering wheel when the lane is changed at a high speed.

As shown in FIG. 15, the inertia compensation current computing means 6 gives an inertia compensation current Ij proportional to the motor angular acceleration estimated value (dω/dt), thereby improving the response of the electric power steering system.

As shown in FIG. 16, the viscous friction compensation current computing means 5 gives a viscous friction compensation current Id proportional to the motor angular velocity estimated value ω and having polarity opposite to that of the value, thereby improving the attenuation of the electric power steering system.

The steering force assist current computing means 7 gives a steering force assist current Is for assisting steering force in accordance with a car speed Vs and a steering torque Vt as shown in FIG. 17 when the driver operates the steering wheel and the steering torque Vt rises, thereby reducing the steering force of the driver. The value of the steering force assist current Is increases as the car speed Vs decreases.

The above currents (Ic, Id, Ij, Is) thus obtained are added together to obtain the target current Isum of the motor 1. The current control means 8 feedback controls the drive current of the motor 1 and drives the motor 1 so that the motor target current Isum and the motor detection current Im become equal to each other.

Friction can be modeled as shown in FIG. 18 according to "University Lecture, Automatic Control" written by Masami Ito. That is, when an object stands still, static friction proportional to the vertical resistance of the object works and when the object has a speed, viscous friction proportional to the speed of the object works based on dynamic friction called "coulomb friction". In contrast to this, in the conventional electric power steering system, the coulomb friction and the viscous friction of the steering system are compensated while static friction is not taken into consideration. Therefore, the conventional electric power steering system has such a problem as a bad steering feeling at around the neutral location of the steering wheel that a driver feels as if the steering wheel were caught when he starts to operate the steering wheel due to the influence of this static friction (to be referred to as "on-center feeling" hereinafter).

In the electric power steering system, when the on-center feeling is heavy as described above, means of adding a current proportional to the differential value of torque to a motor current is generally employed. However, compensation with a current proportional to the differential value of torque is mainly aimed to absorb the influence of the inertia force of the motor 1 as described in Examined Japanese Patent Publication No. 3-42235 and not to compensate for the static friction of the steering system. Therefore, when an inertia compensation current Ij for compensating for the inertia of the motor 1 in the prior art is added to a current proportional to the differential value of torque, the inertia of the motor is compensated excessively, resulting in an unsteady steering feeling or the oscillation of a motor current.

It is an object of the present invention which has been made to solve the above problems to improve the steering feeling by estimating the static friction of the steering system and compensating for this static friction.

SUMMARY OF THE INVENTION

According to a first aspect of the present invention, there is provided an electric power steering system which comprises means of obtaining an estimated value of static friction of a steering system and means of compensating for the static friction of the steering system based on this static friction estimated value.

According to a second aspect of the present invention, there is provided an electric power steering system wherein an increase in steering torque caused by static friction when a driver begins to operate a steering wheel is detected by extracting the edge of a steering force detection value so as to estimate the static friction of the steering system.

According to a third aspect of the present invention, there is provided an electric power steering system wherein the edge of the angular velocity of the steering system is extracted by extracting the edge of motor angular velocity, motor back electromotive force or steering angular velocity so as to estimate the static friction of the steering system.

According to a fourth aspect of the present invention, there is provided an electric power steering system wherein an increase in steering assist force caused by static friction when the driver begins to operate the steering wheel is detected by extracting the edge of a motor current so as to estimate the static friction of the steering system.

According to a fifth aspect of the present invention, there is provided an electric power steering system wherein the edge of the steering force detection value or the like is extracted by a high-frequency pass filter.

According to a sixth aspect of the present invention, there is provided an electric power steering system wherein the time constant of the high-frequency pass filter is made almost equal to the mechanical time constant or acceleration constant of the motor.

According to a seventh aspect of the present invention, there is provided an electric power steering system wherein the edge is extracted during a time interval from the time when the driver begins to operate the steering wheel to the time when the motor begins to turn by multiplying the above edge extracted value by a predetermined function of motor angular velocity, motor back electromotive force or steering angular velocity so as to estimate the static friction of the steering system.

According to an eighth aspect of the present invention, there is provided an electric power steering system wherein an upper value is provided for the static friction estimated value and the upper limit is maintained when the static friction estimated value is larger than the upper limit.

According to a ninth aspect of the present invention, there is provided an electric power steering system wherein the static friction of the steering system is compensated by the positive feedback of the static friction estimated value.

According to a tenth aspect of the present invention, there is provided an electric power steering system wherein the gain of the positive feedback is determined so that the static friction estimated value and the motor output torque become almost equal to each other.

According to an eleventh aspect of the present invention, there is provided an electric power steering system wherein the static friction compensation is obtained from at least a term proportional to the static friction estimated value and a term for compensating for the nonlinearity of the motor or a motor reduction gear to cancel the static friction of the steering system irrespective of the nonlinearity of the motor or the motor reduction gear.

According to a twelfth aspect of the present invention, there is provided an electric power steering system wherein the term for compensating for the nonlinearity of the motor or the motor reduction gear is used when the static friction estimated value is larger than a predetermined value.

According to a thirteenth aspect of the present invention, there is provided an electric power steering system wherein the term proportional to the static friction estimated value is multiplied by a predetermined function for compensating for the nonlinearity of the motor or the motor reduction gear to cancel the static friction of the steering system irrespective of the nonlinearity of the motor or the motor reduction gear.

According to a fourteenth aspect of the present invention, there is provided an electric power steering system wherein an upper limit is provided for at least one or all of the static friction compensation, the term proportional to the static friction estimated value and the term for compensating for the nonlinearity of the motor or the motor reduction gear.

According to a fifteenth aspect of the present invention, there is provided an electric power steering system wherein at least one of the static friction compensation, the term proportional to the static friction estimated value and the term for compensating for the nonlinearity of the motor or the motor reduction gear is multiplied by a predetermined function of motor angular velocity, motor back electromotive force or steering angular velocity to compensate for static friction.

According to a sixteenth aspect of the present invention, there is provided an electric power steering system wherein at least one or all of the static friction compensation, the term proportional to the static friction estimated value and the term for compensating for the nonlinearity of the motor or the motor reduction gear are changed by car speed or engine speed to carry out static friction compensation in accordance with car speed or engine speed.

According to a seventeenth aspect of the present invention, there is provided an electric power steering system wherein at least one or all of the function of motor angular velocity, motor back electromotive force or steering angular velocity, the positive feedback gain, the term for compensating for the nonlinearity of the motor or the motor reduction gear, the predetermined function for compensating for the nonlinearity of the motor or the motor reduction gear and the upper limit are changed by car speed or engine speed to carry out static friction compensation in accordance with car speed or engine speed.

According to an eighteenth aspect of the present invention, there is provided an electric power steering system wherein the dynamic friction or inertia of the steering system is compensated based on the angular velocity or angular acceleration of the motor or the angular velocity or angular acceleration of steering and the static friction of the steering system is compensated based on the static friction estimated value of the steering system.

According to a nineteenth aspect of the present invention, there is provided an electric power steering system wherein the term for compensating for dynamic friction and the term for compensating for static friction are weighted so that one of the two compensating terms is selected.

According to a twentieth aspect of the present invention, there is provided an electric power steering system wherein the term for compensating for dynamic friction, the term proportional to the static friction estimated value and the term for compensating for the nonlinearity of the motor or the motor reduction gear are weighted so that at least one of them is selectively used.

The above and other objects, advantages and features of the present invention will become more apparent from the following description when taken into conjunction with the accompanying drawings.

BRIEF DESCRIPTION OF THE ACCOMPANYING DRAWINGS

Figure 5:
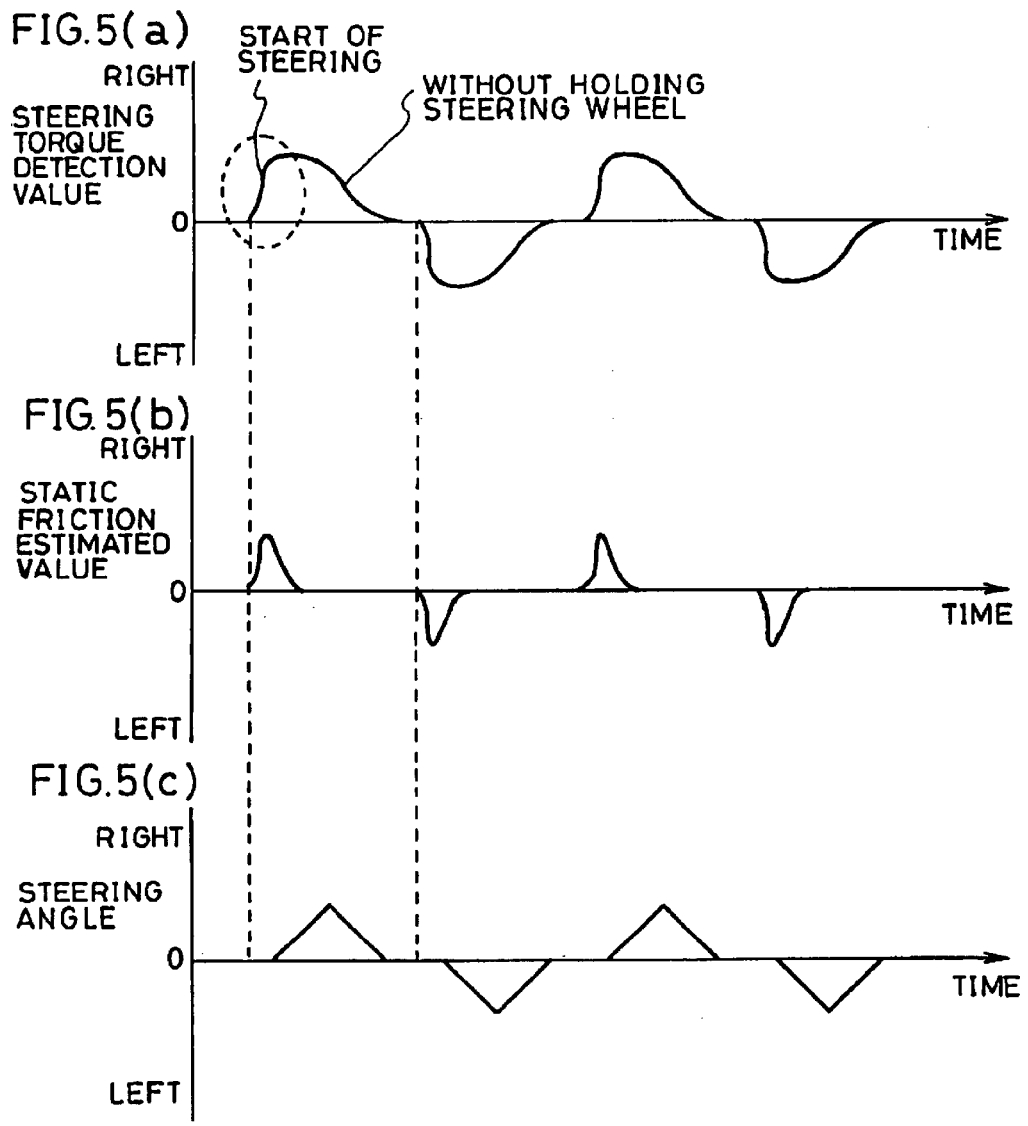
Figure 6:
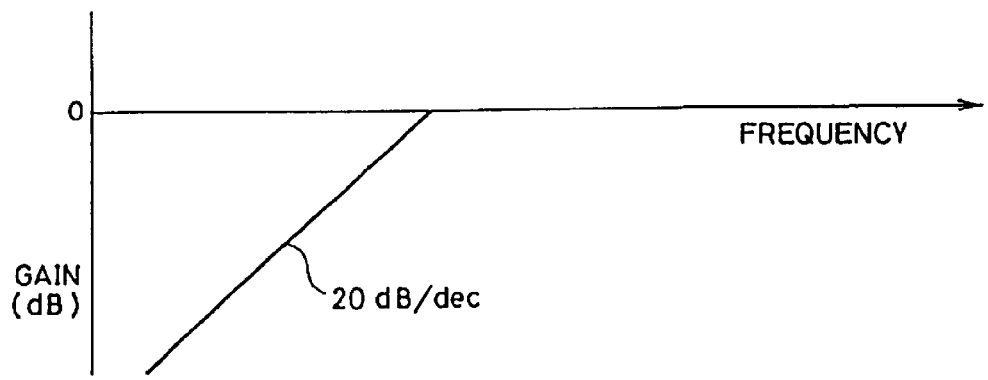
Figure 7:
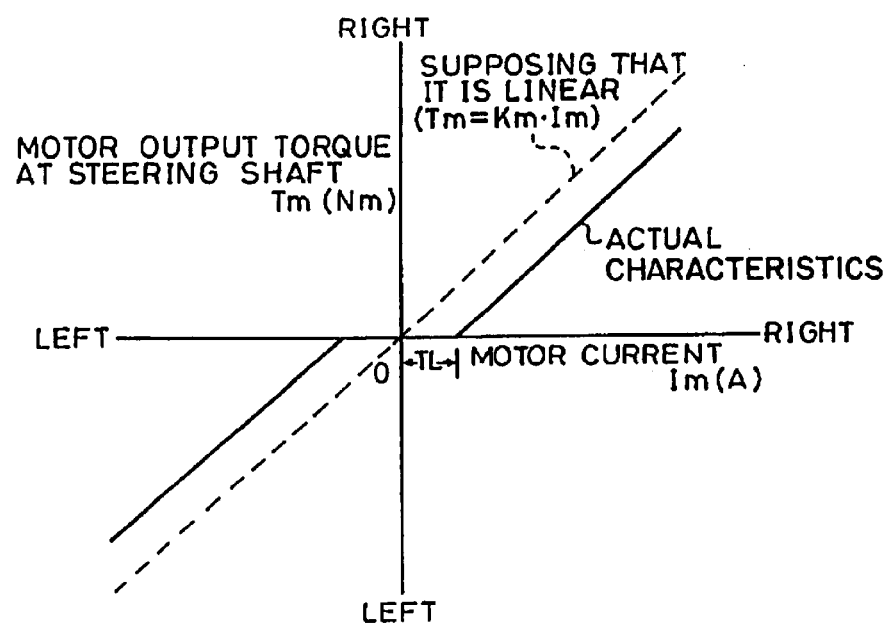
Figure 8:
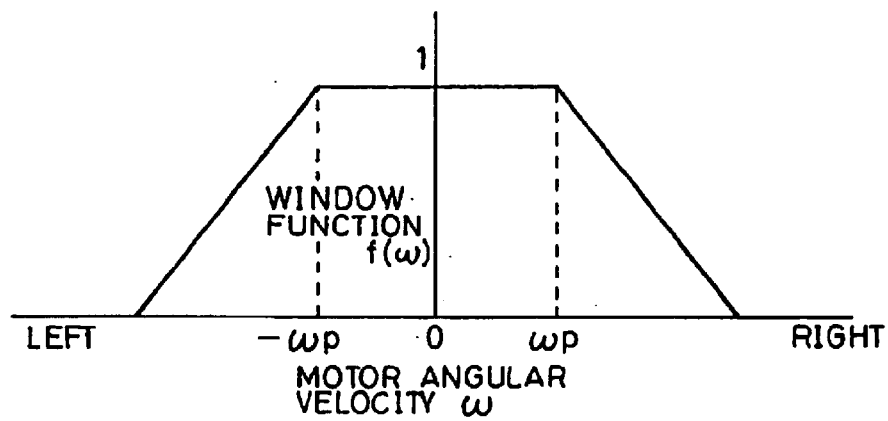
Figure 9:
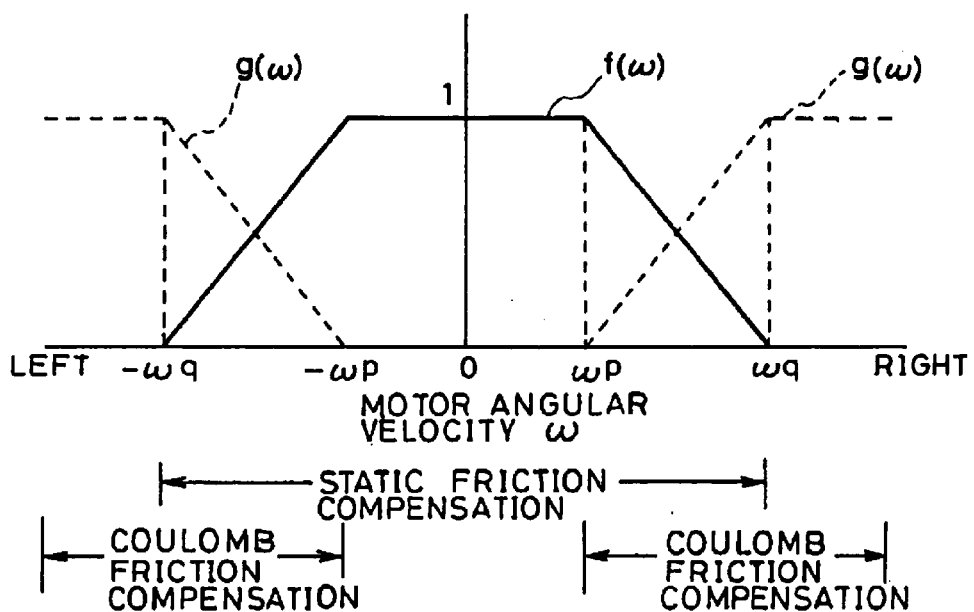
Figure 10:
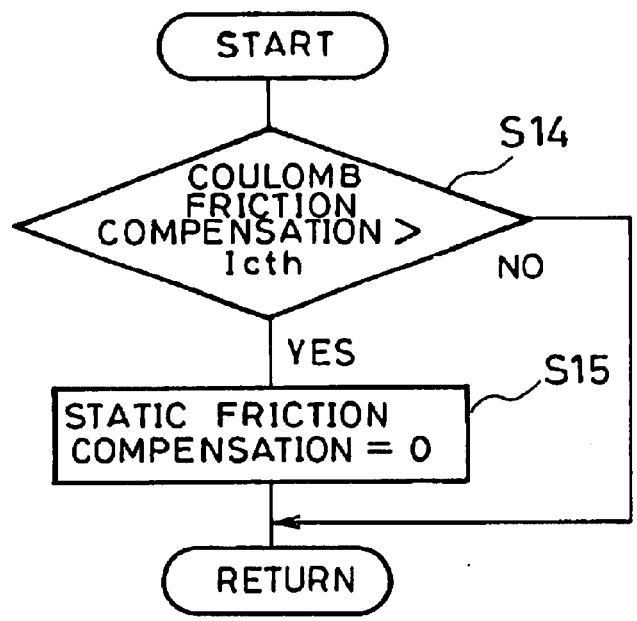
Figure 11:
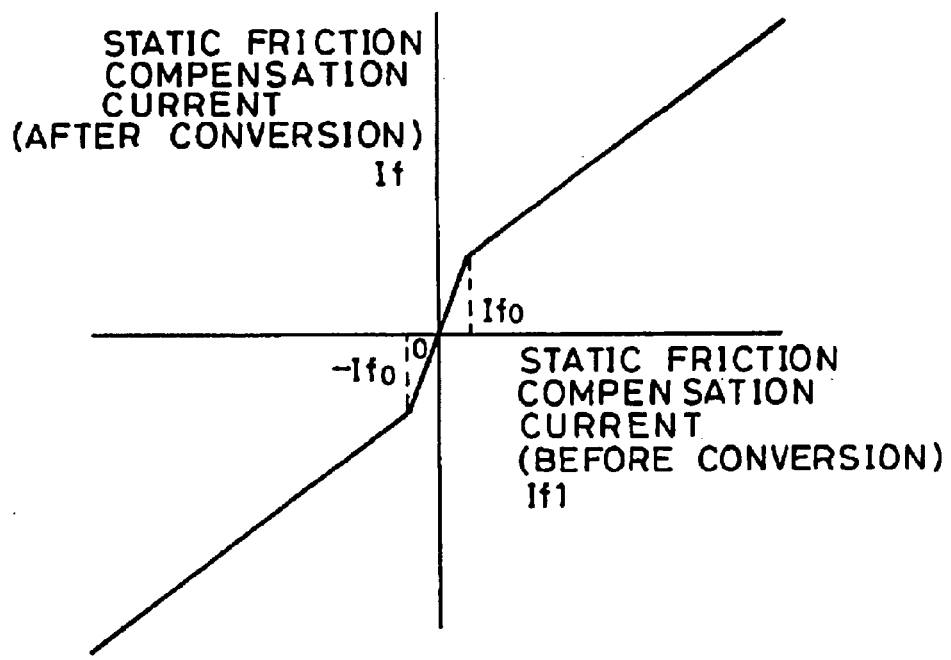
Figure 12:
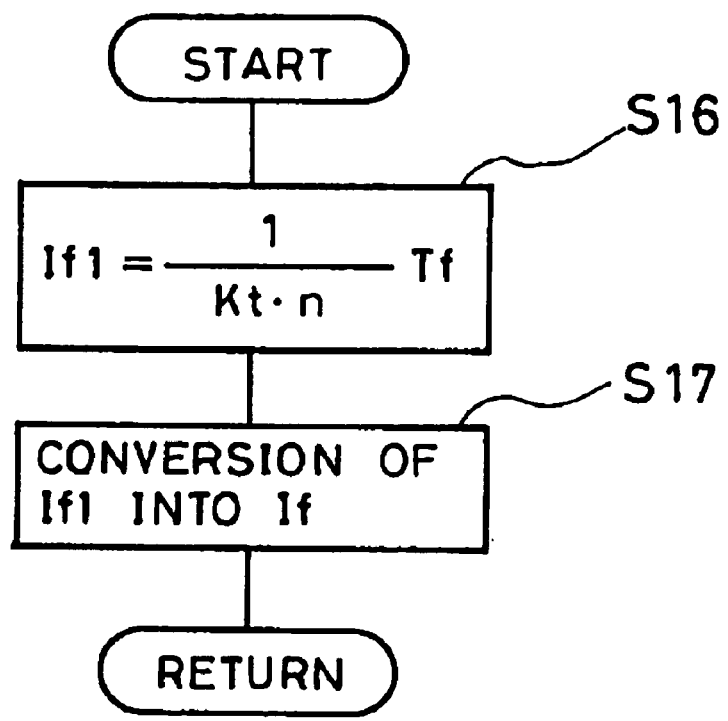
Figure 13:
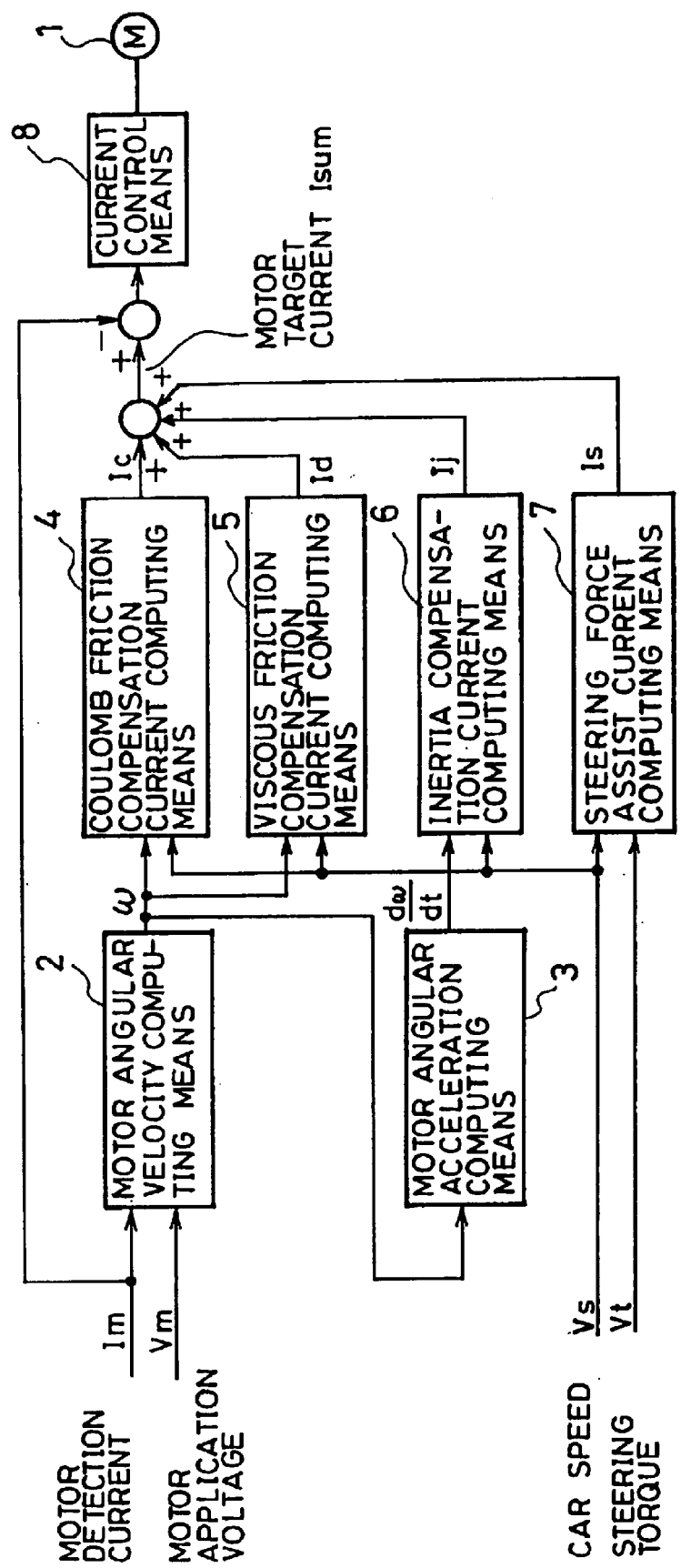
Figure 14:
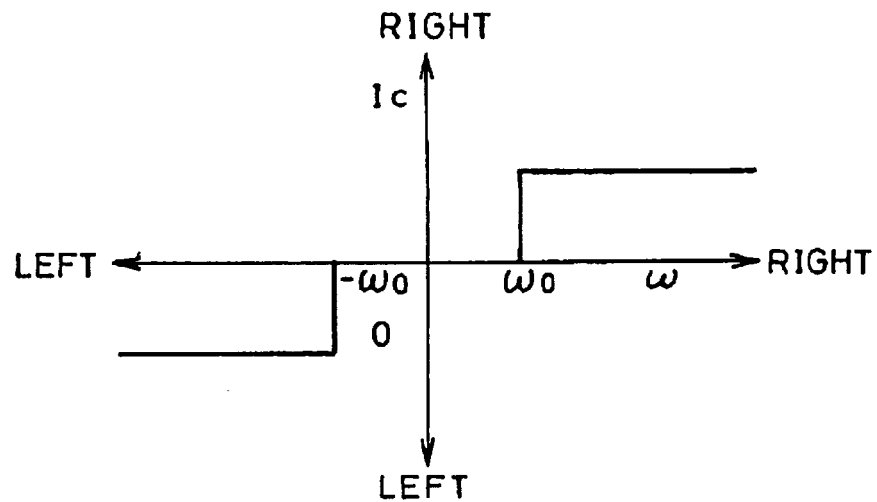
Figure 15:
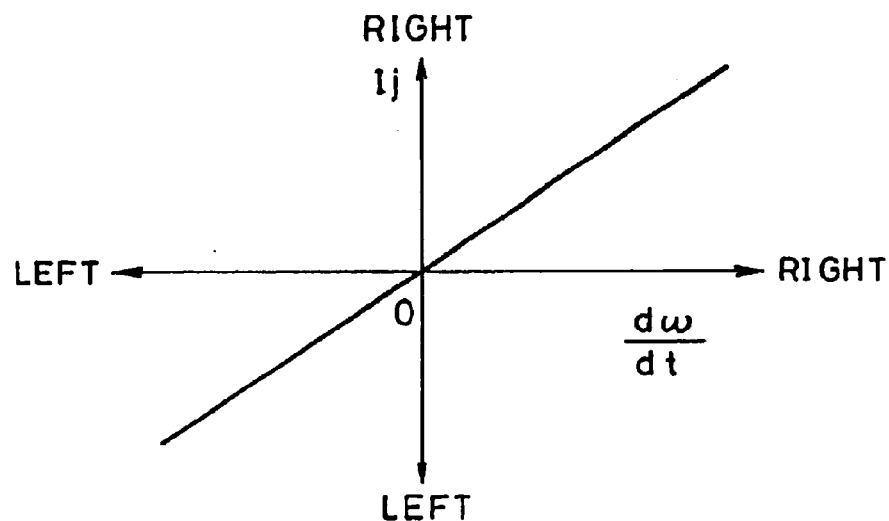
Figure 16:
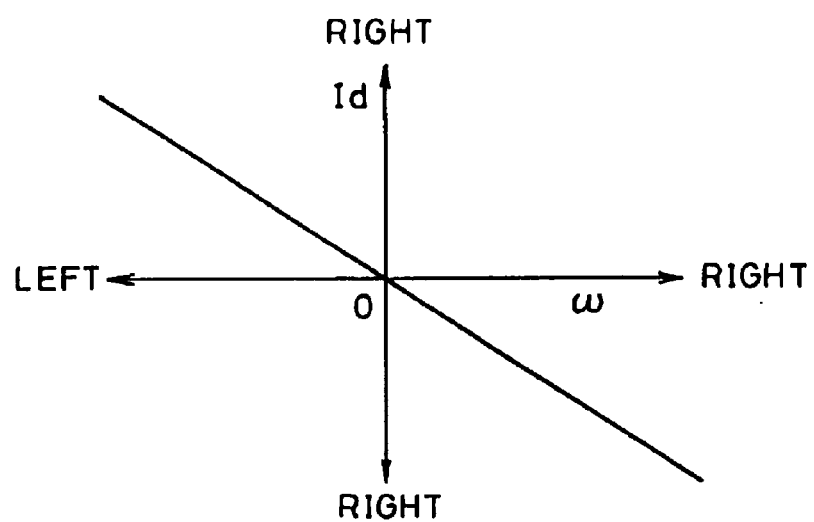
Figure 17:
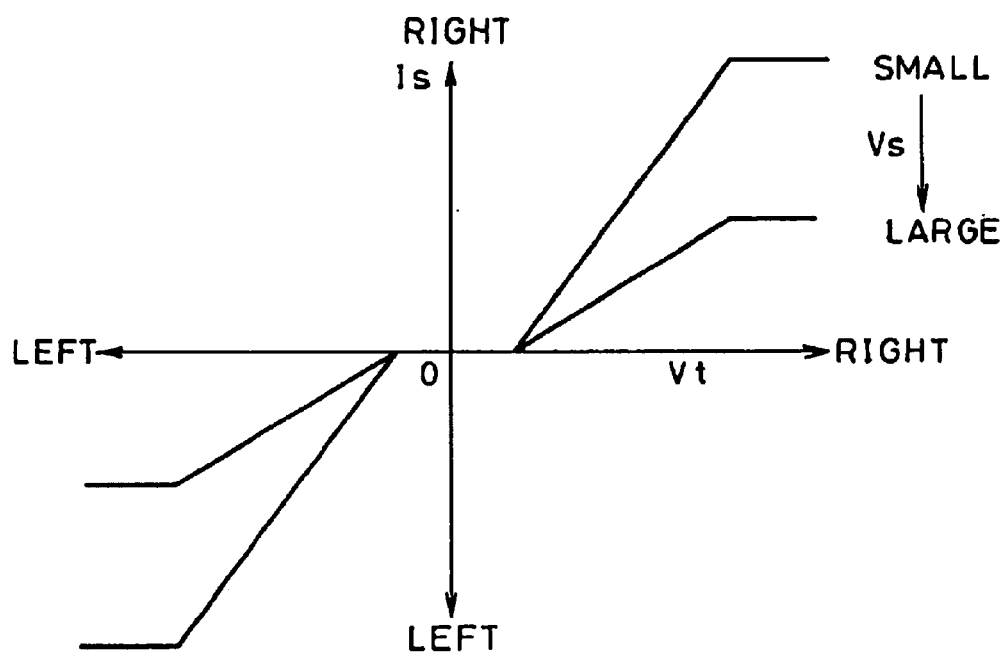
Figure 18:
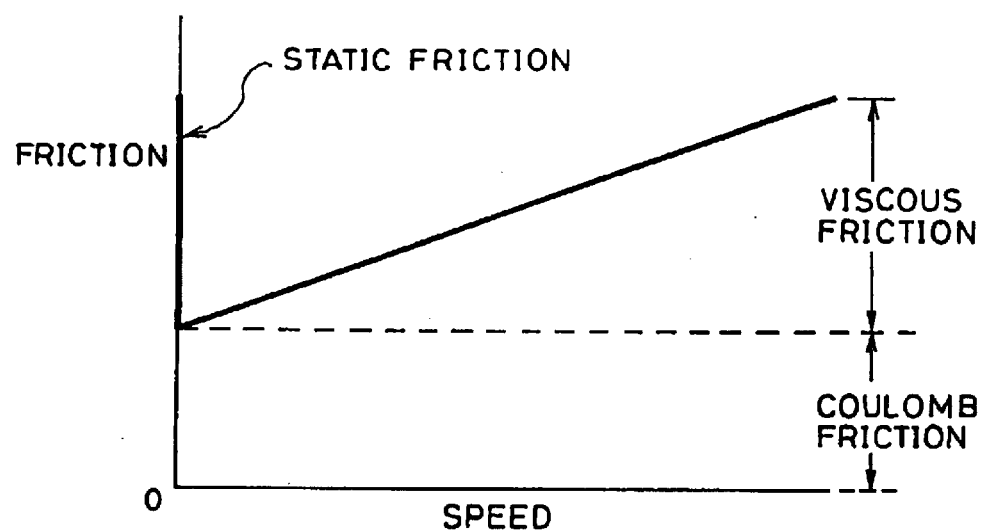

FIGS. 5(a), 5(b) and 5(c) are diagrams showing the waveform of steering torque and the static friction estimated value at the time of operating a steering wheel with large friction;

FIG. 6 is a diagram showing the characteristics of a high-frequency pass filter according to Embodiment 1 of the present invention;

FIG. 7 is a diagram for explaining the friction torque of a motor according to Embodiment 1 of the present invention;

FIG. 8 is a diagram for explaining how to correct a static friction estimated value according to Embodiment 4 of the present invention;

FIG. 9 is a diagram for explaining how to correct a friction compensation current according to Embodiment 5 of the present invention;

FIG. 10 is a flow chart for explaining how to prevent the interference of a friction compensation current according to Embodiment 6 of the present invention;

FIG. 11 is a diagram for explaining how to correct motor friction torque according to Embodiment 7 of the present invention;

FIG. 12 is a flow chart for explaining how to correct motor friction torque according to Embodiment 7 of the present invention;

FIG. 13 is a control block diagram of an electric power steering system of the prior art;

FIG. 14 is a diagram for explaining the operation of coulomb friction compensation current computing means in the electric power steering system of the prior art;

FIG. 15 is a diagram for explaining the operation of inertia compensation current computing means in the electric power steering system of the prior art;

FIG. 16 is a diagram for explaining the operation of viscous friction compensation current computing means in the electric power steering system of the prior art;

FIG. 17 is a diagram for explaining the operation of steering force assist current computing means in the electric power steering system of the prior art; and FIG. 18 is a diagram showing a friction model.

DETAILED DESCRIPTION OF THE PREFERRED EMBODIMENTS

Preferred embodiments of the present invention will be described hereinunder with reference to the accompanying drawings.

In the following description, the same elements as those of the prior art are given the same reference symbols and their descriptions are omitted.

Embodiment 1

Figure 1:
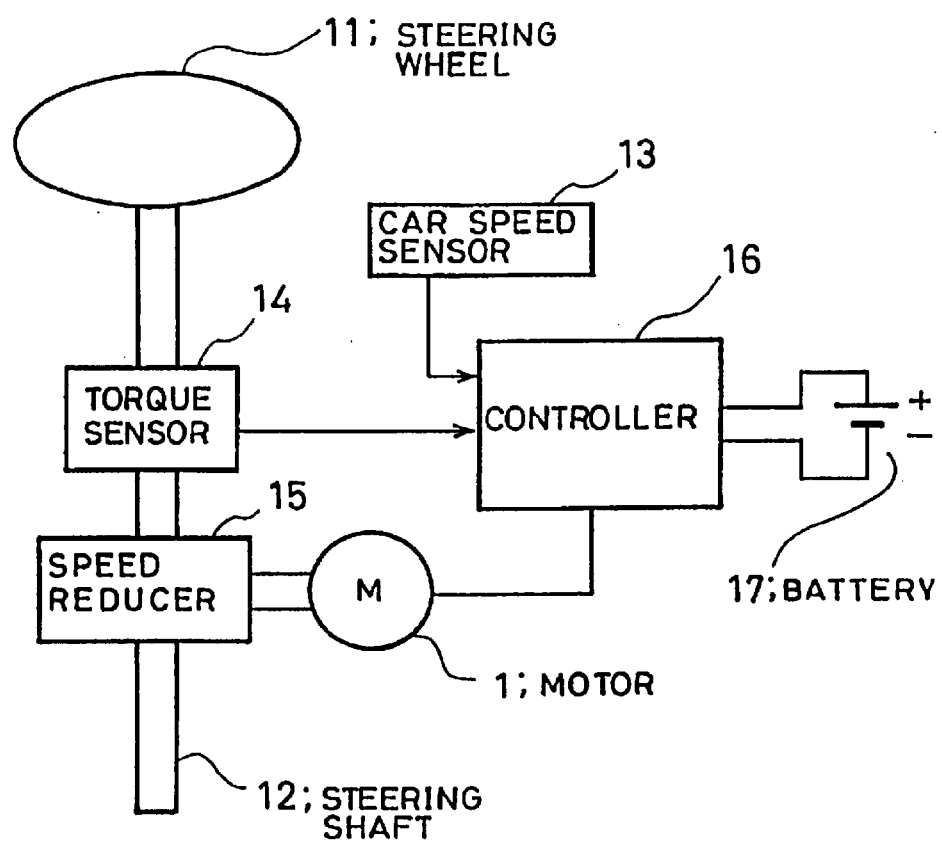
FIG. 1 is a diagram showing the whole constitution of an electric power steering system according to Embodiment 1 of the present invention.

FIG. 1 is a diagram showing the whole constitution of an electric power steering system according to Embodiment 1 of the present invention. In FIG. 1, reference numeral 1 denotes a motor connected to a steering system, 11 a steering wheel, 12 a steering shaft connected to the steering wheel 11, 13 a car speed sensor for detecting the speed of an automobile by detecting the rotation of an unshown transmission, 14 a torque sensor, connected to the steering shaft, for detecting the steering torque of a driver, 15 a motor reduction gear (to be referred to as "reduction gear" hereinafter) for transmitting the output torque of the motor 1 to the steering shaft 12, 16 a controller for driving and controlling the motor 1 based on signals from the car speed sensor 13, the torque sensor 14 and the like, and 17 a battery as a power source for the controller 16.

Figure 2:
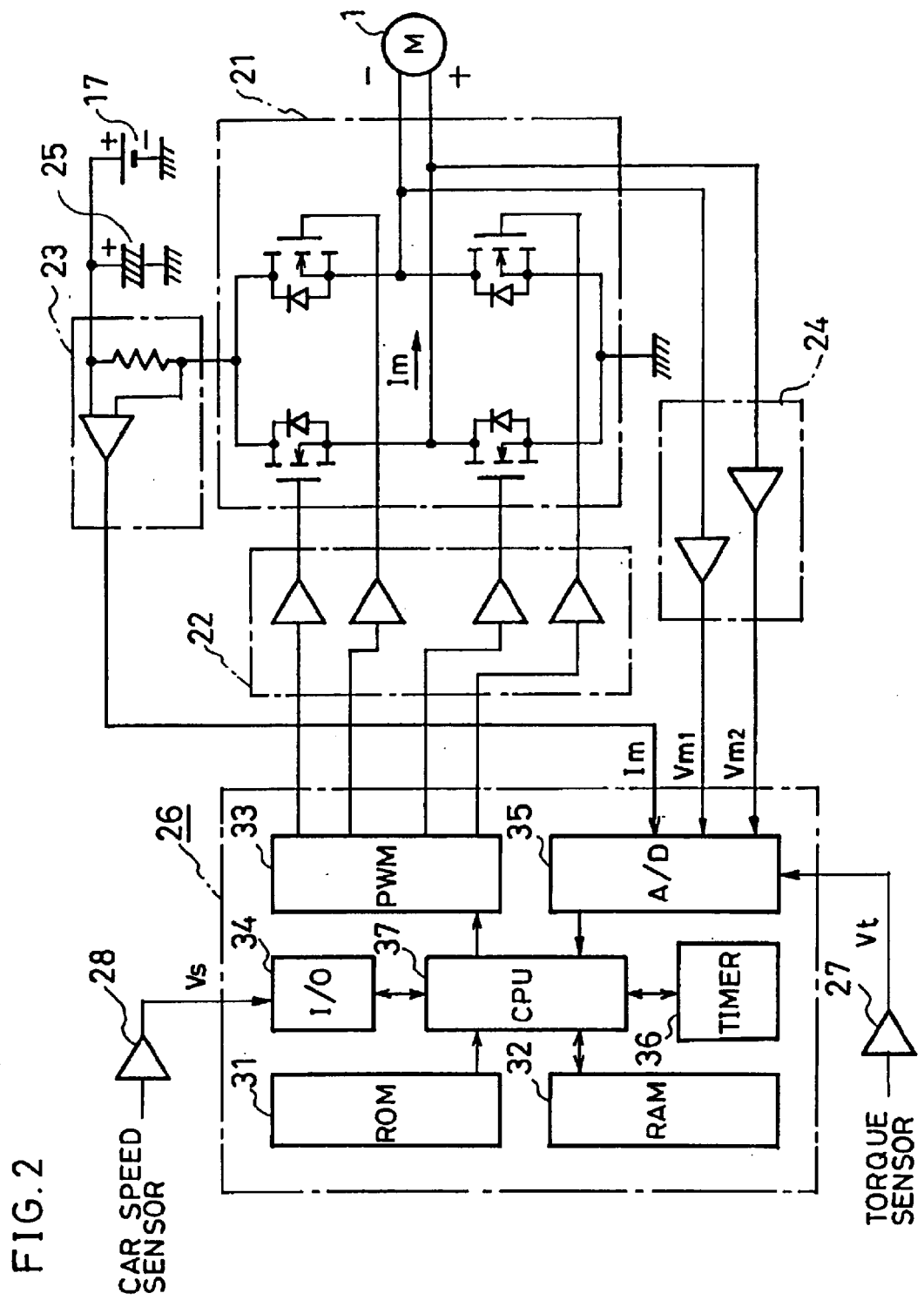
FIG. 2 is a circuit block diagram of the controller of the electric power steering system according to Embodiment 1 of the present invention.

FIG. 2 is a diagram showing the constitution of the hardware of the controller 16. In FIG. 2, reference numeral 21 represents a motor drive circuit, composed of bridge connected power MOSFET's, for supplying a drive current to the motor 1, 22 an FET driver for driving the power MOSFET's, 23 a motor current detection circuit for converting a current running through the motor 1 into a predetermined voltage and outputting it as a motor detection current Im, 24 a motor terminal voltage detection circuit for detecting and outputting positive and negative terminal voltages (motor terminal voltages) Vm1 and Vm2 of the motor 1, and 25 a capacitor for smoothing the voltage of the battery 17 and giving a DC voltage to the motor drive circuit 21. Reference numeral 26 denotes a microcomputer for controlling the FET driver 22 based on the motor detection current Im, the motor terminal voltages Vm1 and Vm2, the output of the torque sensor 14 input through a torque sensor input circuit 27 and the output of the car speed sensor 13 input through a car speed sensor input circuit 28 to drive and control the motor 1.

The microcomputer 26 comprises a ROM 31 for storing a control program and the like, a RAM 32 for temporarily storing data such as the motor detection current Im and the motor terminal voltages Vm1 and Vm2, a PWM modulator 33, connected to the FET driver 22, for generating pulses for the PWM control of the motor 1, an input/output port 34 connected to the car speed sensor 13 through the car speed sensor input circuit 28, an A/D converter 35 connected to the motor current detection circuit 23 and the motor terminal voltage detection circuit 24 and to the torque sensor through the torque sensor input circuit 27, a timer 36 used for the control of a control cycle and a CPU 37 for controlling these elements.

Figure 3:
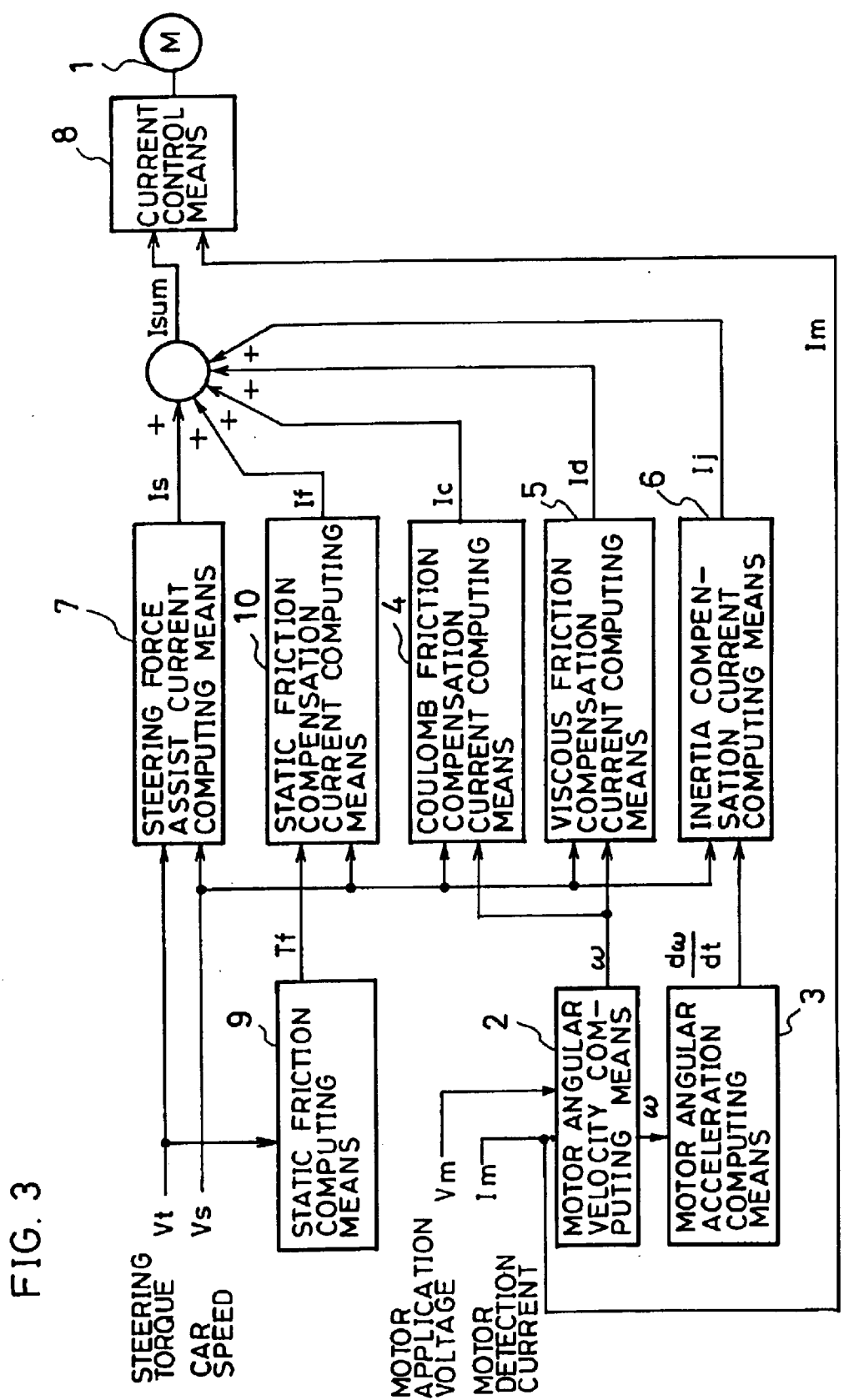
FIG. 3 is a control block diagram of the electric power steering system according to Embodiment 1 of the present invention.
Figure 4:
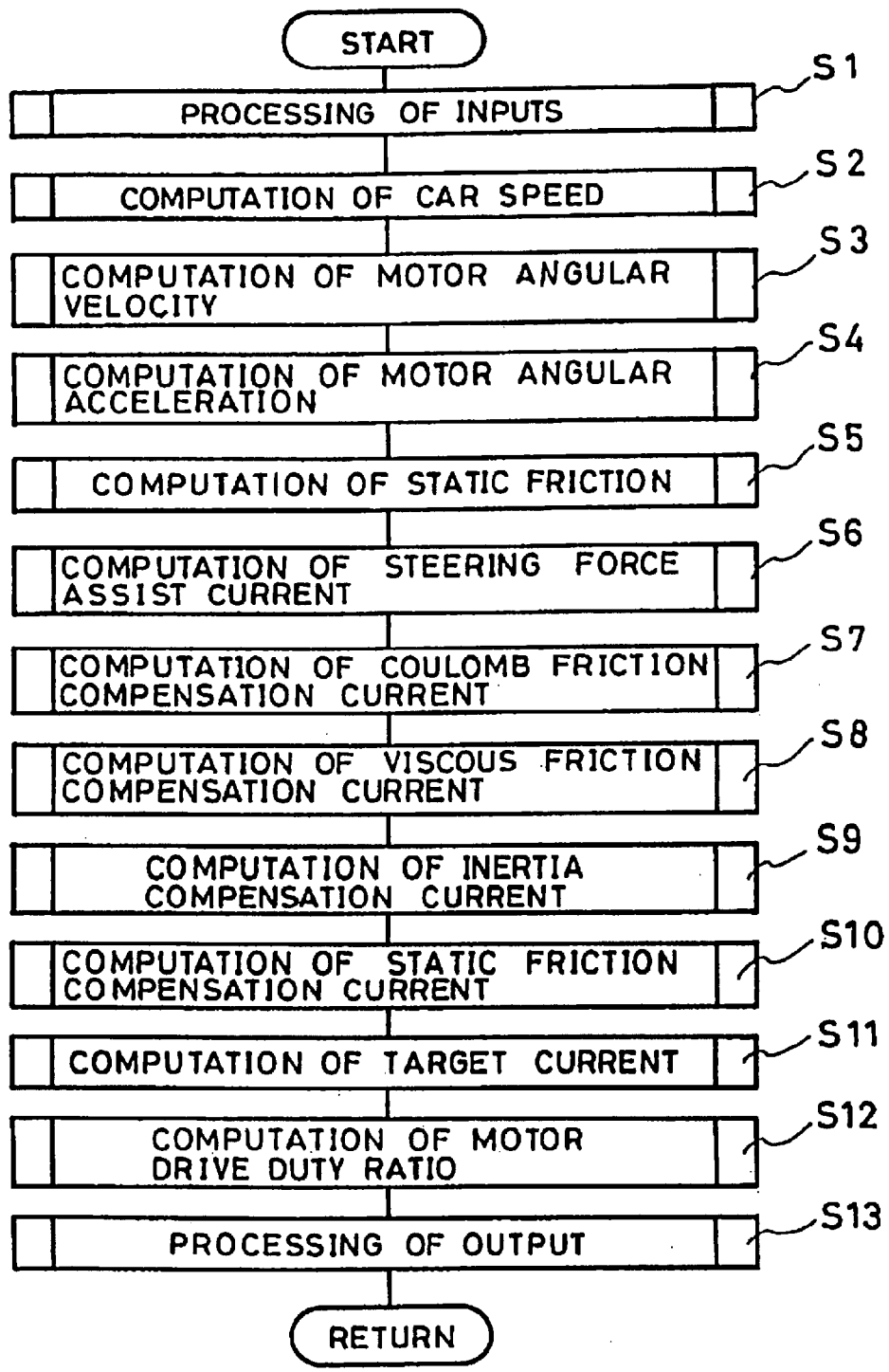
FIG. 4 is a flow chart for explaining the operation of the electric power steering system according to Embodiment 1 of the present invention.

FIG. 3 is a diagram showing the constitution of software stored in the ROM 31 and used for steering control and FIG. 4 is a flow chart for explaining the operation of the software. In FIG. 3, reference numeral 1 denotes a motor, 2 motor angular velocity computing means, 3 motor angular acceleration computing means, 4 coulomb friction compensation current computing means, 5 viscous friction compensation current computing means, 6 inertia compensation current computing means, 7 steering force assist current computing means, and 8 current control means. Reference numeral 9 represents static friction computing means for computing an estimated value Tf of static friction of the steering system from a steering torque Vt from the torque sensor 14, and 10 static friction compensation current computing means for computing a static friction compensation current If for compensating for the static friction of the steering system based on a static friction estimated value Tf from the static friction computing means 9 and a car speed Vs obtained from the output of the car speed sensor 13.

A description is subsequently given of the operation of the electric power steering system of Embodiment 1 based on the flow chart of FIG. 4 with reference to FIGS. 1 to 3. The programs of FIG. 4 are accessed at intervals of a predetermined time from a higher-order program for the control of an execution cycle using a timer 36.

In the first step S1, a motor detection current Im from the motor current detection circuit 23, motor terminal voltages Vm1 and Vm2 from the motor terminal voltage detection circuit 24 and a steering torque Vt from the torque sensor 14, all of which are input into the microcomputer 26, are converted into digital data by the A/D converter 35 and the digital data are read to the RAM 32. In the following step S2, a car speed Vs is computed by measuring the cycle of the output pulse of the car speed sensor 13 input through the input/output port 34 and the result of the computation is stored in the RAM 32.

After the completion of reading data, the back electromotive force Ve of the motor 1 is computed from motor terminal voltages Vm1 and Vm2 and a motor detection current Im by the motor angular velocity computing means 2 of FIG. 3 in step S3 to obtain a motor angular velocity $\omega$. The method of computing the angular velocity $\omega$ is the same as in the prior art and based on the following expression (3):

$$\omega = \{(Vm1 - Vm2) - Im \cdot Ra\}/Ke$$

wherein $\omega$ is a motor angular velocity (rad/s), Vm1 is a motor positive terminal voltage (V), Vm2 is a motor negative terminal voltage (V), Im is a motor detection current (A), Ra is a motor armature resistance ($\Omega$) and Ke is a constant of motor back electromotive force (V·s/rad).

In step S4, the motor angular acceleration computing means 3 differentiates the motor angular velocity $\omega$ obtained in the above step S3 to obtain a motor angular acceleration estimated value ($d\omega/dt$).

In step S5, the static friction computing means 9 computes an estimated value Tf of static friction of the steering system from a steering torque Vt from the torque sensor 14. The operation of step S5 will be described in detail with reference to FIGS. 5(a), 5(b), 5(c) and 6.

FIG. 5(a) is a diagram showing the waveform of a steering torque when the driver operates the steering wheel at a neutral location, FIG. 5(b) is a diagram showing the static friction estimated value which will be described hereinafter, and FIG. 5(c) is a diagram showing changes in steering angle. Even when the steering angle of the steering wheel 11 is so small that the steering wheel 11 rarely moves and the static friction of the steering system is large, as shown in a portion encircled by a broken line of FIG. 5(a), the steering torque increases. When the steering torque is increased by the influence of static friction, the motor 1 begins to turn and the change of steering torque is sharper than that after the steering angle begins to change. Then, the static friction of the steering system is estimated by extracting the edge of the steering torque detection value. A high-frequency pass filter as shown in FIG. 6 is used for the extraction of the edge. By making the time constant of this high-frequency pass filter almost equal to the mechanical time constant or acceleration constant of the motor 1 (for example, several milliseconds), the static friction estimated value Tf is changed to follow a change in the steering torque detection value and converge to "0" when the motor 1 begins to turn as shown in FIG. 5(b). In step S5, the edge of the steering torque detection value is extracted to estimate the static friction of the steering system and the result of the estimation is stored in the RAM 32 as a static friction estimated value Tf.

In steps S6, S7, S8 and S9, as in the prior art, the steering force assist current computing means 7 shown in FIG. 1 computes a steering force assist current Is for assisting the steering force of the driver, and the coulomb friction compensation current computing means 4, the viscous friction compensation current computing means 5 and the inertia compensation current computing means 6 compute a coulomb friction compensation current Ic for compensating for the coulomb friction of the steering system, a viscous friction compensation current Id for compensating for viscous friction and an inertia compensation current Ij for compensating for inertia moment Ij, respectively (see FIGS. 17, 14, 16 and 15).

In step S10, the static friction compensation current computing means 10 computes a static friction compensation current If for compensating for the static friction of the steering system based on the static friction estimated value Tf from the static friction computing means 9 and a car speed Vs obtained from the output of the car speed sensor 13.

It is desired that, during driving, the on-center feeling which is a steering feeling given at the time of the subtle shifting of the steering wheel at around a neutral location should be lightened and when the steering wheel is turned to a great degree, the steering torque should increase in accordance with steering angle. However, in the electric power steering system, as the friction of the motor 1 or the reduction gear 15 is transmitted to the steering shaft 12, the static friction is larger than when a hydraulic power steering system or power steering system is not loaded and the on-center feeling becomes worse. In step S10, a static friction compensation current If for compensating for the static friction of the steering system is computed and the static friction of the steering system is compensated with this static friction compensation current If to improve the on-center feeling.

When seeing the whole constitution of the electric power steering system of FIG. 1, if the static friction of the steering system is obtained, a current for canceling the static friction is added to the current of the motor 1 to cancel the static friction with the output torque of the motor 1, thereby making it possible to compensate for the static friction of the steering system. In this Embodiment 1, a current obtained from both a term proportional to the static friction estimated value and a term for compensating for the nonlinearity of the motor or the motor reduction gear as shown in the following expression (4) is taken as a static friction compensation current If for compensating for the static friction of the steering system.

$$If = (Tf/Kt \cdot n) + (TL/Kt) \cdot sgn(Tf-Dz) \quad (4)$$

wherein If is a static friction compensation current (A), Kt is a motor torque constant (Nm/A), Kt is a motor negative terminal voltage (V), n is a motor reduction ratio, Tf is a static friction estimated value of the steering system (Nm), TL is a friction torque of the motor or the reduction gear (Nm) and Dz is a friction torque compensation dead zone (Nm).

The above expression (4) will be described in detail hereinunder.

When the relationship between the motor detection current Im and the motor output torque Tm at the steering shaft 12 (after speed reduction) is linear, the following expression (5) can be established.

$$Tm = n \cdot Im \cdot Kt \quad (5)$$

wherein Tm is a motor output torque at the steering shaft (Nm) and Im is a motor detection current (A).

To cancel the static friction of the steering system with the output torque of the motor, (static friction of steering system) may be made equal to (motor output torque at steering shaft). Therefore, in the above expression (5), when Tf=Tm, the first term on the right side of the above expression (4) is obtained.

In fact, the relationship between the motor detection current Im and the motor output torque Tm at the steering shaft becomes nonlinear by the influence of the friction of the motor 1 or the reduction gear 15 as shown in FIG. 7. The second term on the right side of the above expression (4) is for compensating for this nonlinearity. When the static friction estimated value Tf of the steering system exceeds a predetermined dead zone Dz, a current equal to the friction torque TL of the motor 1 or the reduction gear 15 is added in the same direction as Tf by the above second term. The above dead zone Dz is set to a level (for example, 0.2 to 0.3 Nm) that suppresses the influence of noise contained in the static friction estimated value Tf of the steering system and that the driver does not feel during the operation of the steering wheel.

In step S11, the current control means 8 adds the above obtained currents Is, Ic, Id, Ij and If together to compute the target current Isum of the motor 1. In the subsequent step S12, feedback control such as proportional integral control is carried out so that the target current Isum and the motor detection current Im become equal to each other and the duty ratio for driving the motor 1 is determined. In step S13, the above duty ratio is set in the PWM modulator 33 to drive the motor drive circuit 21 through the FET driver 22. The above steps S12 and S13 are equivalent to the current control means 8 of FIG. 1.

In the electric power steering system of Embodiment 1, the static friction computing means 9 estimates the static friction of the steering system by extracting the edge of the detection value of steering torque Vt to obtain a static friction estimated value Tf and the static friction compensation current computing means 10 compensates for the static friction of the steering system based on the above static friction estimated value Tf. Therefore, the on-center feeling can be improved. Further, since the dynamic friction, static friction and inertia moment of the steering system can be all controlled by combining conventional controls making use of motor angular velocity and angular acceleration, not only the on-center feeling can be improved but also a good steering feeling can be obtained under all steering conditions. Moreover, as a new sensor is not required, there is no increase in costs.

Embodiment 2

In the above Embodiment 1, the static friction of the steering system is estimated by extracting the edge of the steering torque detection value Vf. The same effect can be obtained by extracting the edge of the angular velocity of the steering system. The angular velocity may be motor angular velocity ω, back electromotive force Ve, steering speed or the like. In this Embodiment 2, the static friction of the steering system is estimated by extracting the edge of the angular velocity of the steering system. Therefore, the static friction can be estimated without being influenced by the noise of the torque sensor 14.

Embodiment 3

In the above Embodiment 1, the static friction of the steering system is estimated by extracting the edge of the steering torque detection value Vf. The same effect can be obtained by extracting the edge of a motor current. The motor current encompasses not only a motor detection current Im but also a compensation current such as a steering force assist current Is.

For instance, when a static friction compensation current If is computed based on the edge of a steering force assist current Is which is a current constituting a motor target current Isum, appropriate static friction compensation can be made on steering assist force as the static friction compensation current If changes according to steering assist force at a car speed Vs as shown in FIG. 17.

When a static friction compensation current If is computed based on a motor target current Isum or a motor detection current Im, the static friction of the motor 1 can be compensated more accurately as the static friction is detected and compensated during a time interval from the time when electricity is supplied to the motor 1 to the time when the motor 1 begins to turn.

Embodiment 4

In the above Embodiments 1 to 3, the static friction of the steering system is estimated by extracting the edge of steering torque or steering speed. The influence of noise can be eliminated and the estimation accuracy of static friction can be improved when the static friction is estimated from the extracted value of the edge by multiplying the extracted value of the edge by a window function $f(\omega)$ which becomes zero when the motor 1 or the steering wheel 11 turns. Any signal function is acceptable as this window function $f(\omega)$ if it represents a motor angular velocity, back electromotive force, steering speed or other speed of the steering system. FIG. 8 shows an example when the above window function $f(\omega)$ is a function of motor angular velocity $\omega$. The window function $f(\omega)$ is 1 when the absolute value of motor angular velocity $\omega$ is equal to or smaller than $\omega p$ and rapidly becomes zero when the absolute value of motor angular velocity $\omega$ exceeds $\omega p$. The above $\omega p$ is set to such a small angular velocity that the motor or the steering wheel stops.

In this Embodiment 4, static friction is multiplied by the window function $f(\omega)$, and the static friction of the steering system is extracted only when the motor or the steering wheel stops, thereby making it possible to estimate static friction more accurately and to further improve the steering feeling.

When the torque sensor 14 malfunctions due to line disconnection, the steering torque detection value becomes excessive in a right or left direction abruptly and the extracted value of this edge, that is, the static friction estimated value becomes also excessive. As a result, static friction compensation becomes excessive, the steering force becomes too light, and steering becomes instable temporarily. In this Embodiment 4, static friction is multiplied by the window function $f(\omega)$ and the static friction of the steering system is extracted only when the motor or the steering wheel stops. Therefore, static friction compensation can be prevented from becoming excessive at the time of a failure and a safer electric power steering system can be provided.

Embodiment 5

In the above Embodiment 4, a static friction estimated value Tf is obtained by multiplying a predetermined edge extracted value with a function of the speed of the steering system. The same effect can be obtained by multiplying a static friction compensation current If by the above widow function $f(\omega)$. Further, in this Embodiment 5, as shown in FIG. 9, a window function $g(\omega)$ for the compensation of dynamic friction which becomes 1 when the absolute value of motor angular velocity $\omega$ is larger than $\omega q$ and becomes zero quickly when the absolute value of motor angular velocity $\omega$ is smaller than $\omega q$ is multiplied by a coulomb friction compensation current Ic and the above window function $f(\omega)$ is multiplied by a static friction compensation current If so that both can be selectively used. For instance, when $\omega p<\omega q$, the absolute value of motor angular velocity $\omega$ is smaller than $\omega p$, $f(\omega)=1$ and $g(\omega)=0$. Hence, static friction compensation is carried out. When the absolute value of motor angular velocity $\omega$ is larger than $\omega q$, $f(\omega)=0$ and $g(\omega)=1$. Hence, dynamic friction compensation is carried out. Therefore, interference between static friction compensation and dynamic friction compensation can be prevented and the steering feeling can be further improved.

Since viscous friction compensation can be considered as dynamic friction compensation, the same window function as the above $g(\omega)$ may be multiplied so that viscous friction compensation and static friction compensation can be selectively carried out. The second term on the right side of the above expression (4) is for compensating for the friction torque of the motor 1, which is the same as a coulomb friction compensation current Ic in purpose. Therefore, when the window functions $f(\omega)$ and $g(\omega)$ are multiplied so that the second term on the right side of the above expression (4) and the coulomb friction compensation current Ic can be selectively used, almost the same effect can be obtained.

In the above example, the window functions $f(\omega)$ and $g(\omega)$ having linearly rising or falling characteristics are used for weighing so that viscous friction compensation and static friction compensation can be selectively carried out. It is needless to say that weighing with rising or falling characteristics in consideration of the characteristics of the motor 1 or the reduction gear 15 makes it possible to carry out more precise friction compensation.

Embodiment 6

In the above Embodiments 4 and 5, the predetermined function of the speed of the steering system is multiplied by a static friction estimated value Tf or a static friction compensation current If to prevent unrequired operation of static friction compensation. The same effect can be obtained when static friction compensation is selectively carried out by the following conditional branching.

FIG. 10 is a flow chart for explaining the operation of this embodiment. The program is accessed in step S10 of FIG. 4. In step S14, it is checked if the coulomb friction compensation current Ic is larger than a predetermined value Icth. When Ic>Icth, the static friction compensation current is made zero in step S15 to carry out only dynamic friction compensation. When Ic≦Icth, the routine ends.

Thus, in this Embodiment 6, static friction compensation is carried out according to the compensation amount of dynamic friction without referring to a table on window function data or multiplying a window function. Therefore, the load of the microcomputer 26 can be reduced.

Embodiment 7

In the above Embodiment 1, the nonlinearity of the motor 1 is compensated by the second term on the right side of the above expression (4). A conversion table for increasing the value of static friction compensation current when the computed value of static friction compensation current is small as shown in FIG. 11 is stored in the ROM 31 and used to convert the static friction compensation current into a value for compensating for the nonlinearity of the motor 1, thereby canceling nonlinearity between the motor detection current Im and the motor output torque Tm.

The method of computing static friction compensation in this Embodiment 7 will be described in detail with reference to the flowchart of FIG. 12. The program of FIG. 12 corresponds to the step S10 in the flow chart of FIG. 4 and to the static friction compensation current computing means 10 in the block diagram of FIG. 1. In step S16, a static friction compensation current If1 is first computed from the following expression (6).

$$If1=(Tf/Kt \cdot n) \tag{6}$$

If1 is the first term on the right side of the above expression (4). In the next step S17, If1 is converted into an actually used static friction compensation current If based on characteristics shown in the conversion table of FIG. 11, for example. The conversion table is used to convert If1 into a value obtained by multiplying If1 by a predetermined proportional coefficient when the absolute value of If1 is equal to or smaller than a predetermined value If0 and a value which changes at a smaller gradient than the above proportional coefficient when the absolute value of If1 is larger than the predetermined value If0 so as to compensate for nonlinearity in the rising characteristics of the motor 1 or the reduction gear 15. Other processing are the same as in Embodiment 1.

In this Embodiment 7, since the nonlinearity of the motor 1 or the reduction gear 15 can be compensated more accurately, the steering feeling can be further improved.

Embodiment 8

An upper limit may be provided for the static friction estimated value constituting a static friction compensation current, static friction compensation, the term proportional to the static friction estimated value of static friction compensation and the term for compensating for the nonlinearity of the motor or the reduction gear so that at least one or all of them become equal to or smaller than a predetermined value based on the actually measured value of static friction, for example. Since excessive compensation can be thereby prevented, it is possible to prevent the steering feeling from becoming too light or the steering torque from oscillating. The same effect can be obtained when an upper limit is provided for the static friction compensation current.

Embodiment 9

Since it is considered that friction force changes if a load from the road surface is changed by car speed, the static friction compensation current is changed based on car speed to realize optimal static friction compensation according to car speed in Embodiment 9, thereby making it possible to further improve the steering feeling. Even when other control gain such as that of the steering force assist current computing means 7 or the like is changed by car speed, optimal static friction compensation can be realized.

The positive feedback gain $1/(Kt \cdot n)$ of the static friction estimated value in the above expression (4) and friction torque TL for compensating for the nonlinearity of the motor 1 or the reduction gear 15 are conceivable as what is changed by car speed. The window functions in FIGS. 8 and 9, the function constituting the conversion table of FIG. 11, or the upper limit of the static friction estimated value or the like in the above Embodiment 8 may be changed by car speed.

The same effect can be obtained when the engine speed may be used in place of the car speed.

As having been described above, according to the first aspect of the present invention, since the static friction of the steering system is estimated and compensated, the steering feeling such as the on-center feeling can be improved.

According to the second aspect of the present invention, since the static friction of the steering system is estimated by extracting the edge of the steering force detection value, the static friction of the steering system can be estimated without providing a new sensor.

According to the third aspect of the present invention, since the static friction of the steering system is estimated by extracting the edge of motor angular velocity, motor back electromotive force or steering angular velocity, the static friction of the steering system can be estimated without being influenced by noise.

According to the fourth aspect of the present invention, since the static friction of the steering system is estimated by extracting the edge of the motor current, the static friction can be detected and compensated during a time interval from the time when electricity is supplied to the motor to the time when the motor begins to turn, thereby making it possible to compensate for the static friction of the motor more accurately.

According to the fifth aspect of the present invention, since the edge is extracted by a high-frequency pass filter, the static friction of the steering system can be estimated with a simple structure.

According to the sixth aspect of the present invention, since the time constant of the high-frequency pass filter is made almost equal to the mechanical time constant or acceleration constant of the motor, the static friction of the steering system can be estimated accurately.

According to the seventh aspect of the present invention, since the extracted value of the edge is multiplied by a predetermined function of motor angular velocity, motor back electromotive force or steering angular velocity to estimate the static friction of the steering system, the static friction of the steering system can be estimated accurately.

According to the eighth aspect of the present invention, since an upper limit is provided for the static friction estimated value, excessive compensation can be prevented.

According to the ninth aspect of the present invention, since the static friction of the steering system is compensated by carrying out the positive feedback of the static friction estimated value, the steering feeling such as the on-center feeling can be improved without providing a new sensor.

According to the tenth aspect of the present invention, since the positive feedback gain is determined such that the static friction estimated value and the motor output torque become almost equal to each other, the static friction of the steering system can be compensated accurately.

According to the eleventh aspect of the present invention, since the static friction compensation is obtained from at least a term proportional to the static friction estimated value and a term for compensating for the nonlinearity of the motor or the motor reduction gear, the static friction of the steering system can be compensated accurately.

According to the twelfth aspect of the present invention, since the term for compensating for the nonlinearity of the motor or the motor reduction gear is used only when the static friction estimated value is larger than a predetermined value, the compensation of the nonlinearity can be carried out accurately.

According to the thirteenth aspect of the present invention, since the term proportional to the static friction estimated value is multiplied by a predetermined function for compensating for the nonlinearity of the motor or the motor reduction gear to compensate for the static friction, the static friction of the steering system can be compensated accurately.

According to the fourteenth aspect of the present invention, since an upper limit is provided for at least one of the static friction compensation, the term proportional to the static friction estimated value and the term for compensating for the nonlinearity of the motor or the motor reduction gear, excessive compensation can be prevented, thereby making it possible to prevent the steering from becoming too light or the steering torque from oscillating.

According to the fifteenth aspect of the present invention, since at least one of the static friction compensation, the term proportional to the static friction estimated value and the term for compensating for the nonlinearity of the motor or the motor reduction gear is multiplied by a predetermined function of motor angular velocity, motor back electromotive force or steering angular velocity to compensate for the static friction, the static friction of the steering system can be compensated accurately.

According to the sixteenth aspect of the present invention, since at least one of the static friction compensation, the term proportional to the static friction estimated value and the term for compensating for the nonlinearity of the motor or the motor reduction gear is changed based on car speed or engine speed, the steering feeling such as the on-center feeling can be further improved.

According to the seventeenth aspect of the present invention, since at least one of the function of motor angular velocity, motor back electromotive force or steering angular velocity, the positive feedback gain, the term for compensating for the nonlinearity of the motor or the motor reduction gear, the predetermined function for compensating for the nonlinearity of the motor or the motor reduction gear and the upper limit is changed based on car speed or engine speed, the steering feeling such as the on-center feeling can be further improved.

According to the eighteenth aspect of the present invention, since the dynamic friction or inertia of the steering system is compensated based on the angular velocity or angular acceleration of the motor or steering and the static friction of the steering system is compensated based on the static friction estimated value of the steering system, the dynamic friction, static friction and inertia moment of the steering system can be all controlled, thereby making it possible to obtain not only a good on-center feeling but also a good steering feeling under all steering conditions.

According to the nineteenth aspect of the present invention, since the term for compensating for dynamic friction and the term for compensating for static friction are weighed so that one of them is used, interference between static friction compensation and dynamic friction compensation can be prevented, thereby making it possible to further improve a steering feeling.

According to the twentieth aspect of the present invention, since the term for compensating for dynamic friction, the term proportional to the static friction estimated value and the term for compensating for the nonlinearity of the motor or the motor reduction gear are weighed so that at least one of them is used, interference between static friction compensation and dynamic friction compensation can be prevented, thereby making it possible to compensate for the friction of the steering system accurately.

What is claimed is:

1. An electric power steering system for driving a motor connected to a steering system based on a steering force detection value obtained by detecting the steering force of a driver to assist the steering force of the steering system, the system comprising:
   a means of computing an estimated value of static friction of the steering system based on the steering force of a driver; and
   a means of compensating for the static friction based on this estimated value of static friction.

2. The electric power steering system of claim 1, wherein the static friction of the steering system is estimated by extracting the edge of the steering force detection value.

3. The electric power steering system of claim 2, wherein an upper limit is provided for the static friction estimated value.

4. The electric power steering system of claim 1, wherein the static friction of the steering system is estimated by extracting the edge of a motor current.

5. The electric power steering system of claim 1, wherein the static friction of the steering system is estimated by extracting an edge of the steering force detection value, the motor angular velocity, the motor back electromotive force, the steering angular velocity or the motor current, wherein the extraction of the edge is carried out through a high frequency pass filter.

6. The electric power steering system of claim 5, wherein the time constant of the high-frequency pass filter is made almost equal to the mechanical time constant or acceleration constant of the motor.

7. The electric power steering system of claim 1, wherein the static friction of the steering system is estimated by extracting an edge of the steering force detection value, the motor angular velocity, the motor back electromotive force, the steering angular velocity or the motor current, and the static friction of the steering system is estimated by multiplying an extracted value of the edge by a predetermined function of motor angular velocity, motor back electromotive force or steering angular velocity.

8. The electric power steering system of claim 1, wherein static friction compensation having a term proportional to the static friction estimated value obtained by the positive feedback of the static friction estimated value is computed and the static friction of the steering system is compensated by the static friction compensation.

9. The electric power steering system of claim 8, wherein the gain of the positive feedback is set such that the static friction estimated value and the motor output torque become almost equal to each other.

10. The electric power steering system of claim 8, wherein an upper limit is provided for at least one or all of the static friction compensation performed through the means of compensating for the static friction, the term proportional to the static friction estimated value obtained through the means of computing the estimated value of the static friction and the term for compensating for the nonlinearity of the motor or the motor reduction gear.

11. The electric power steering system of claim 1, wherein static friction compensation obtained through the means of compensating for the static friction is obtained from both a term proportional to the static friction estimated value and a term for compensating for the nonlinearity of the motor or a motor reduction gear.

12. The electric power steering system of claim 11, wherein the term for compensating for the nonlinearity of the motor or the motor reduction gear is used when the static friction estimated value is larger than a predetermined value.

13. The electric power steering system of claim 1, wherein the static friction is compensated by multiplying the term proportional to the static friction estimated value obtained through the means of computing the estimated value of the static friction by a predetermined function for compensating for the nonlinearity of the motor or the motor reduction gear.

14. The electric power steering system of claim 1, wherein the static friction is compensated by multiplying at least one or all of the static friction compensation performed through the means of compensating for the static friction, the term proportional to the static friction estimated value obtained through the means of computing the estimated value of the static friction, and the term for compensating for the nonlinearity of the motor or the motor reduction gear by a predetermined function of motor angular velocity, motor back electromotive force and steering angular velocity.

15. The electric power steering system of claim 1, wherein at least one or all of the static friction estimated value obtained through the means of computing an estimated value of the static friction, the static friction compensation performed through means of compensating for the static friction, the term proportional to the static friction estimated value obtained through the means of computing the estimated value of the static friction and the term for compensating for the nonlinearity of the motor or the motor reduction gear are changed based on car speed or engine speed.

16. The electric power steering system of claim 15, wherein at least one or all of the function of motor angular velocity, motor back electromotive force or steering angular velocity, the positive feedback gain, the term for compensating for the nonlinearity of the motor or the motor reduction gear, the predetermined function for compensating for the nonlinearty of the motor or the motor reduction gear and the upper limit are changed based on car speed or engine speed.

17. The electric power steering system of claim 1, wherein the dynamic friction or inertia of the steering system is compensated based on the angular velocity or angular acceleration of the motor or steering.

18. The electric power steering system of claim 17, wherein a term for compensating for dynamic friction and a term for compensating for static friction are weighed so that one of them is used.

19. The electric power steering system of claim 17, wherein the term for compensating for dynamic friction, the term proportional to the static friction estimated value and the term for compensating for the nonlinearity of the motor or the motor reduction gear are weighed so that at least one of them is used.

* * * * *